United States Patent [19]

Loubier

[11] Patent Number: 4,897,914
[45] Date of Patent: Feb. 6, 1990

[54] METHOD OF MAKING A MAGNETIC-ENCODING DEVICE HAVING HALL EFFECT DEVICES

[76] Inventor: Robert J. Loubier, 5122 Chippewa Ct., Fort Wayne, Ind. 46804

[21] Appl. No.: 285,499

[22] Filed: Dec. 16, 1988

Related U.S. Application Data

[62] Division of Ser. No. 652,867, Sep. 20, 1984, Pat. No. 4,829,248.

[51] Int. Cl.<sup>4</sup> ............................................. H01F 7/06
[52] U.S. Cl. .................................................. 29/602.1
[58] Field of Search ................... 29/602.1; 338/32 H; 324/202, 208, 117 H, 251, 174; 307/309

[56] References Cited

U.S. PATENT DOCUMENTS

| | | | |
|---|---|---|---|
| 3,636,767 | 1/1972 | Duffy | 73/861.77 |
| 3,742,243 | 6/1973 | Gamble | 324/171 |
| 4,110,676 | 8/1978 | Edick et al. | 324/174 |
| 4,216,458 | 8/1980 | Edwards | 338/32 H |
| 4,295,118 | 10/1987 | Herr et al. | 338/32 H |
| 4,635,353 | 1/1987 | Tamagne | 29/602.1 |
| 4,691,185 | 9/1987 | Loubier et al. | 338/32 H |

FOREIGN PATENT DOCUMENTS 2539548  7/1976  Fed. Rep. of Germany ...... 324/174

Primary Examiner—P. W. Echols
Attorney, Agent, or Firm—Pearne, Gordon, McCoy & Granger

[57] ABSTRACT

Reproducibility in the manufacture of rotating shaft sensing encoders and similar devices employing Hall effect switching devices to sense changes in magnetic fields is achieved in the present invention by forming a frame of the encoder as a unitary or one piece arrangement for both supporting a shaft bearing and an angular behavior sensor, such as a Hall effect switch, thus controlling tolerances, air gaps and angular orientation of the sensor. Calibration of such a device to compensate for manufacturing variability in the Hall sensing device as well as any other variabilities in the encoder is then achieved by providing a reversable calibrating magnetic field close to the Hall effect switch and moving that magnetic field until the desired switch calibration is achieved.

3 Claims, 2 Drawing Sheets

METHOD OF MAKING A MAGNETIC-ENCODING DEVICE HAVING HALL EFFECT DEVICES

This is a division of application Ser. No. 652,867, filed Sept. 20, 1984, now U.S. Pat. No. 4,829,248.

SUMMARY OF THE INVENTION

The present invention relates generally to the calibration of a Hall effect device, for example a digital Hall effect switch, to the coordination of two or more such calibrated Hall effect devices, to an encoder employing such calibrated and coordinated Hall effect devices for providing an electrical output indicative of the angular behavior of a rotatable magnet and to a simple arrangement of a Hall effect switch and actuating, rotatable magnet to provide a minimum air gap therebetween.

The Hall effect is a well known phenomenon occurring in conductors or semiconductor materials wherein a current flowing generally perpendicular to a magnetic field induces a voltage perpendicular to both the field and current which voltage is proportional to the product of the current and magnetic field. Currently commercially available digital Hall effect switches capitalize on the Hall effect to provide a switch which is responsive to a magnetic field. Such switches, employing amplifiers and/or Schmidt triggers in integrated circuit form, control the current in the Hall effect sensor and switch between high and low output voltages accordingly as an incident magnetic field reaches prescribed threshold levels. Such digital Hall effect switches have a generally rectangular hysteresis loop so that, for example, once the incident magnetic field reaches the level necessary to turn the switch "on" that incident magnetic field will need to be reduced or in some cases reversed to turn the switch back "off". The difference between the magnetic field intensity (flux density) at which the switch turns "on" (also referred to as the operate point) and that at which the switch turns "off" (the release point) is referred to as the hysteresis of the Hall effect switch. There is a great deal of variability in the operate point, the release point and to a somewhat lesser extent in the hysteresis within production runs of digital Hall effect switches making it quite difficult to mass produce devices employing these switches with any consistency. Presorting mass produced switches to select those with very closely similar characteristics is a common, expensive practice, but serves as one solution to the manufacturing variability problem.

There are a wide range of applications for such Hall effect switches, including position monitoring and counting environments. For example, the number or fraction of turns of a shaft, shaft angular velocity, or even shaft angular acceleration, may be monitored by positioning a wheel on such a shaft having a magnetized periphery of alternating north and south poles with a Hall effect switch mounted adjacent to that periphery to change its state each time the relatively moving periphery of the wheel changes from a north to a south pole. In this exemplary environment the Hall effect switch provides a square wave output as the shaft rotates at a constant speed and subsequent digital processing of this square wave output provides the desired information about shaft rotation. The greater the number of poles disposed about the periphery of the wheel, the more accurate the sensing of the shaft angular behavior becomes. Of course, for a given wheel size, there is an upper bound on the number of poles about its periphery which can be sensed by the Hall effect switch beyond which the Hall effect device fails to sense passage of the poles.

Such an arrangement to monitor the angular behavior of a shaft, that is maintaining a count of the number of turns or fractions of turns executed by the shaft, the angular velocity of the shaft, or the angular acceleration of the shaft, or even sensing a particular angular orientation of that shaft have a wide variety of applications including, by way of example, electronic commutation of direct current motors, fluid or other material metering devices, monitoring or control of machine processes, as well as other environments in which the accurate monitoring of the angular behavior of a rotatable shaft is desired.

The manufacturing variability of digital Hall effect devices, as well as the requirement for precise positioning of such devices relative to such an exemplary rotating magnetic wheel, make it extremely difficult to achieve a fifty percent duty cycle, square wave output at constant wheel angular velocity since device variations as well as variation in the air gap between the switching device and the wheel periphery significantly affect differences between the time interval during which the switch is "on" and the time interval during which the switch is "off". For some subsequent signal processing applications this variability may be disastrous.

Providing a bias magnet of a magnetic field strength peculiar to the particular Hall device in an attempt to provide products of uniform behavior have been attempted and while providing suitable end product such techniques vastly increase the production costs of such products.

Such prior art biasing magnets were externally threaded, elongated bars polarized between the ends in a conventional manner. The threaded magnets were mounted in a frame device with one end adjacent to the Hall effect switch. By turning the magnet, it would adjust in the sense of altering its distance from the Hall effect switch and thereby varying the bias field strength.

Among the several objects of the present invention may be noted the achievement of the abovementioned goals and avoidance of the abovementioned problems; the provision of a method and apparatus for accurately calibrating a Hall effect switching device; the provision of a Hall device type encoder of enhanced reliability and accuracy; the provision of shaft angular behavior monitoring devices of improved uniformity and reduced cost; the provision of a method and apparatus for calibrating a digital Hall effect switch employing means for applying a reversible calibrating magnetic field to the Hall device; and the provision of an encoder which provides an electrical output indicative of the angular behavior of a rotatable shaft which may be easily and quickly calibrated. These as well as other objects and advantageous features of the present invention will be in part apparent and in part pointed out hereinafter.

In general, an encoder has a unitary supporting frame having a peripherally magnetized wheel and a Hall sensor mounted thereon, the center of the wheel and the point of maximum sensitivity of the sensor being accurately located by means of preformed frame portions. The wheel is magnetized such that the poles are normal to the periphery, and the sensor is disposed adjacent to the periphery with minimum air gap. The flux concentration from the periphery is thus centered on the point of maximum sensitivity without requiring any adjustments of the sensor with respect to the wheel. A second field sensor may also be similarly supported on the frame circumferentially spaced from the first sensor and located on an arc concentric with the periphery, and the outputs of the two sensors processed to provide a more accurate indication of wheel motion and an indication of the direction of that motion.

Also in general and in one form of the invention, a digital Hall effect switch is calibrated by mounting a permanent magnet closely adjacent to that switch with the axis of magnetization being adjustable through a range sufficient to change or reverse the sense or direction of the permanent magnet field component to which the Hall effect switch is responsive. Such magnetic biasing of the switch may be accomplished by a permanent magnet which is of a generally cylindrical shape magnetized in a direction perpendicular to the cylinder axis so as to provide diametrically opposite north and south poles with the calibrating adjustment being accomplished by rotating the cylinder about its mechanical axis.

Still further in general and in one form of the invention, an encoding device having a pair of digital Hall effect switches located closely adjacent the periphery of a magnetized wheel is calibrated by matching the response characteristics of the respective switches to one another by subjecting each switch independently to a biasing magnetic field to calibrate the switches. Switches may be accurately angularly separated from one another relative to the axis of wheel rotation so that when one switch is aligned with a magnetic pole on the wheel the other switch is centered between a pair of adjacent poles thus facilitating subsequent processing of the switch outputs to provide a more accurate indication of the rotational behavior of the wheel and an associated shaft.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
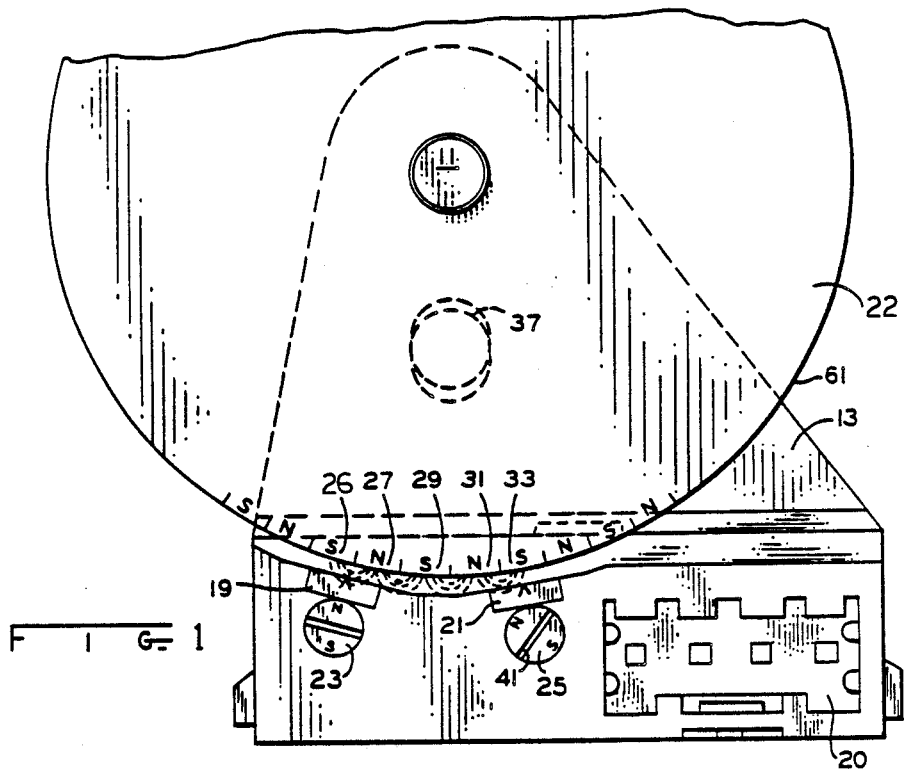
FIG. 1 is a plan view of the supporting frame, shaft mounted magnetized wheel and a pair of calibratable magnetic field sensors forming an encoder embodying the present invention.
Figure 2:
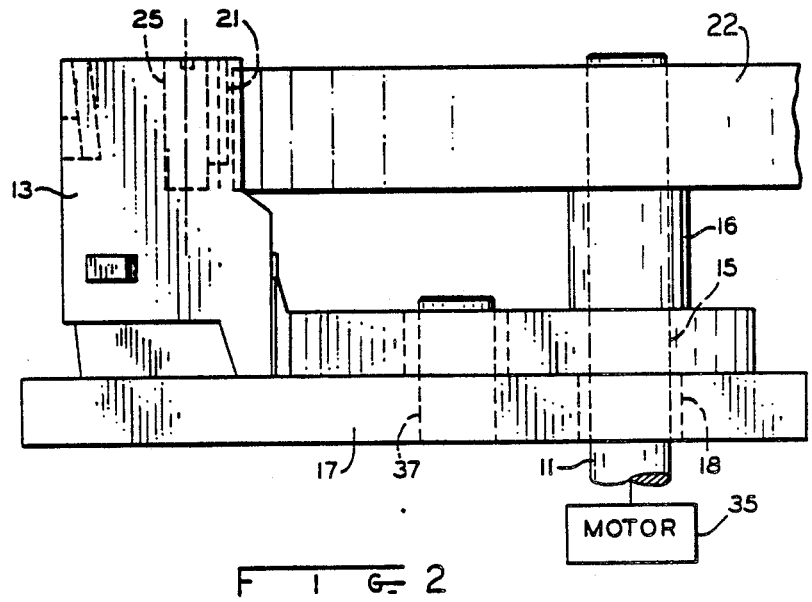
FIG. 2 is side elevation view of the encoder of FIG. 1 from the right side of that figure.

Referring first primarily to FIGS. 1 and 2 an encoder or transducer for providing an electrical output indicative of the angular behavior of a rotatable shaft 11 is illustrated. The encoder has a unitary or one piece supporting frame 13 which may be a metal casting or molded of a plastic material, so long as it does not contain ferromagnetic materials too close to the magnetic parts. The supporting frame 13 has a hole or opening 15 for receiving a bearing in which shaft 11 rotates or simply a hole closely fitting around shaft 11 so that frame 13 is accurately positioned relative to the shaft 11. A spacer bearing 16 may be included. The supporting frame 13 also includes a series of pockets or other arrangements for accurately positioning and supporting a pair of digital Hall effect switches 19 and 21 and a pair of calibrating magnets 23 and 25.

Fixed to shaft 11 for rotation therewith is a wheel 22 having a magnetized periphery illustrated as alternating north and south poles such as 26, 27, 29, 31 and 33. Shaft 11 may be driven by a motor, pump for other moving or metering device 35 with the particular device 35 being monitored being immaterial to the present invention. Supporting frame 13 may be mounted as desired in its environment as on base 17 containing shaft bearing 18 and may include an antirotation or locating pin 37 and may in turn support other circuit or related components 20 as desired.

The digital Hall effect switches 19 and 21 may be alike and may be any of several commercially available Hall sensor-integrated circuit chips such as a Sprague UGN 3030. An exemplary one of these switches 21 and its associated trim or calibrating magnet 25 are illustrated in FIG. 3.

Figures 3, 7:
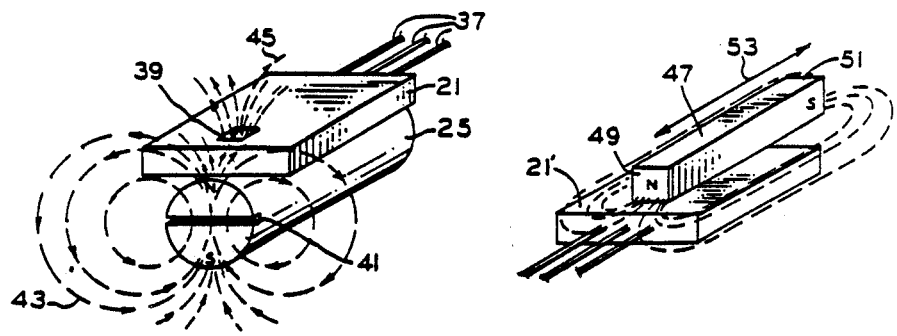
FIG. 3 is a perspective view of one of the digital Hall effect switches of FIGS. 1 and 2 illustrating the Hall sensor and its interaction with the field of the adjustable biasing magnet.
FIG. 7 illustrates a variation on the arrangement of FIG. 3.

In FIG. 3 the exemplary digital Hall effect switch 21 includes three electrical leads one of which is a power supply lead, another the output lead and the third a common or ground lead with those leads indicated generally by reference numeral 37. The Hall effect sensitive area is identified as 39 and it is the effective magnetic flux passing through the area 39 which functions to switch the device 21 between its two states, i.e. between an output signal and no output signal. Juxtaposed with the switch 21 is the trim or biasing magnet 25 which as illustrated is formed as a generally cylindrical permanent magnet with the axis of its magnetic polarity lying generally perpendicular to the cylinder axis. Cylinder 25 may include a screwdriver adjusting slot 41 which solely for reference purposes is illustrated as lying generally perpendicular to both the cylinder axis and the axis of magnetic polarization of the cylinder 25. Illustrative magnetic flux lines 43 and 45 emanating from the north surface of the cylinder and terminating at the south surface are also illustrated. As the cylinder 25 is rotated about its axis the effective field on the sensor area 39 begins to diminish until the screwdriver slot extends generally perpendicular to the switch 21 at which time the effective flux through area 39 has diminished to zero. Continued rotation of the cylinder 25 now reverses the magnetic biasing applied to area 39 until after a complete half turn from the position illustrated the south pole of cylinder 25 is most nearly adjacent switch 21 and biasing is again at a maximum but at a reversed polarity from the originally illustrated position. Thus, one half turn of cylinder 25 runs through the entire range of magnetic biasing from a maximum in one direction through zero and to a maximum in the opposite sense or direction. An alternative to the transversely magnetized by cylindrical permanent magnet 25 of FIG. 3 is a linearly polarized bar magnet such as 47 of FIG. 7 having exemplary ends 49 and 51 as north and south poles respectively. Linear movement of the bar magnet 47 as indicated by arrow 53 and of a range sufficient to position the north pole 49 near the magnetic field sensitive element or to position the south pole 51 near the sensitive element will similarly be adequate to provide a reversible calibrating magnetic field for the Hall effect switch 21'.

Figure 4:
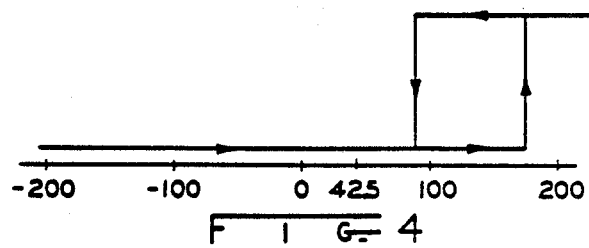
FIG. 4 illustrates a hysteresis loop for the Hall switch.
Figure 5:
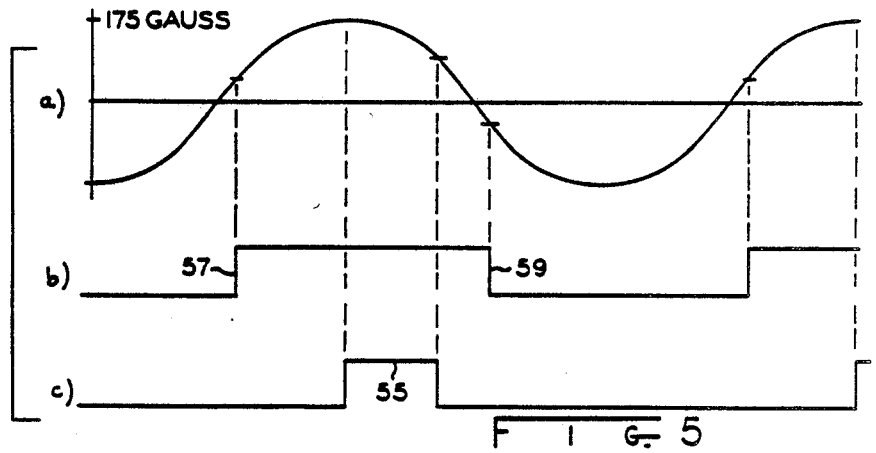
FIG. 5 is a series of wave forms illustrating the effect of magnetic bias on a digital Hall effect switch.

As noted earlier, the manufacturing tolerances on Hall effect switching devices are not very sharp and variations in not only the hysteresis (width of the hysteresis loop in FIG. 4) but also the operating and releasing points are common. A typical Hall effect switching device might have the hysteresis characteristics illustrated in FIG. 4 wherein switch output voltage is illustrated as a function of flux density and wherein the operating point of the switch, i.e. where the switch output changes to a high level, might be at 175 gauss while the release point for the particular switch selected might be at 90 gauss giving an effective hysteresis for that particular switch of 85 gauss. In order to utilize this particular switching device advantageously in the present illustrated environment it is desirable that the hysteresis loop be centered about a zero or null normal magnetic field and the shifting of the hysteresis loop toward the left as illustrated in FIG. 4 is accomplished by the calibrating or biasing magnet associated with that switch. The effect of the magnetic bias of the calibrating magnets may be thought of in either of two ways and in either case it is only the component of the bias magnet field normal or perpendicular to the sensitive area 39 which is effective. The bias component actually shifts the waveform of FIG. 5a up or down. If the horizontal scale of FIG. 4 is thought of as net or resultant flux normal to sensitive area 39 then the effect of the bias component is to shift the hysteresis loop to the left or right by the effective magnitude of the constant bias component. The required shifting in the illustrated case would be 132.5 gauss in a negative sense. This illustrative shift is obtained by turning the calibrating magnet until the component of its magnetic field perpendicular to sensitive area 39 is 132.5 gauss in the proper sense. Thus once properly positioned the calibrating magnet continuously applies a fixed bias field to the sensor and the passage of the moving poles such as 26 and 27 merely sequentially adds to and subtracts from this bias. The Hall device itself still has an operate point at 175 gauss and a release point at 90 gauss, however, a constant subtractive 132.5 gauss component is supplied by the helper or bias magnet 25. The reason for biasing the switch so that the hysteresis loop is symetric about a zero field will be better understood in reference to FIG. 5.

Figure 6:
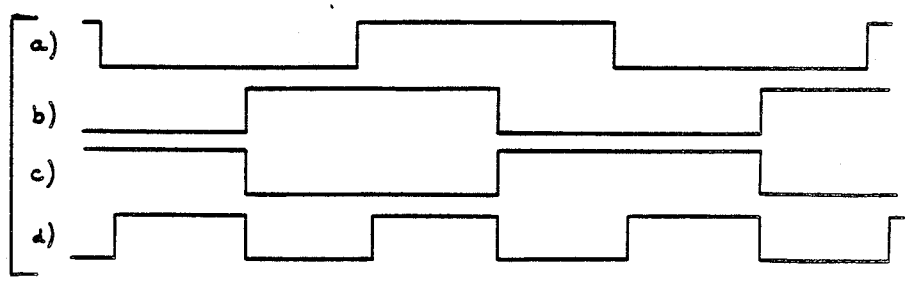
FIG. 6 is a series of wave forms illustrating preferred outputs from the two Hall effect switches of FIGS. 1 and 2 and their utilization.

Rotation of the wheel 23 presents a nearly sinusoidal magnetic field to the sensor element as illustrated by wave form 5a. If switch 21 is, as described in conjunction with FIG. 4, unbiased, then the operating point of 175 gauss turns the switch on for a relatively short interval, as illustrated by the pulse 55 in FIG. 5c, which pulse lasts until the field drops to 90 gauss, at which time the pulse trailing edge drops back to a zero output or off level. Such an arrangement of relatively short output pulses and relatively long intervening periods of no output might well be adequate for a simple counting of the number of poles passing the switch, but may not be adequate for other uses. Shifting the hysteresis loop of the switch 21 as illustrated in FIG. 4 toward the left until it is symetric about the zero gauss vertical line then causes the switch to turn on or operate at 42.5 gauss as illustrated by leading edge 57 of the pulse in wave form 5b, while that pulse has its trailing edge 59 associated with a negative 42.5 gauss field which occurs exactly 180° after the operating point for the switch. With this arrangement the switch is on for a time period the same as the time period during which the switch is off giving as a resultant wave form the square wave illustrated in FIG. 5b. Subsequent processing of such a square wave wherein the time on and the time off are substantially the same is illustrated conceptually in FIG. 6.

Returning briefly to FIG. 1, it will be noted that the digital Hall effect switch 21 is directly adjacent a south pole 33, while at the same time the switch 19 is centered between south pole 26 and north pole 27. Thus the angular separation between switches 19 and 21 is some integral number of poles plus and additional one-half pole, so that the square wave output from switch 21, as illustrated in FIG. 6b is phase-shifted 90 electrical degrees from the square wave output of switch 19 as illustrated in FIG. 6a. For one direction of rotation of the wheel 22, say counterclockwise, as viewed in FIG. 1 the output of switch 19 might lag 90 electrical degrees behind the output of switch 21 as illustrated. However, if the direction of wheel rotation is reversed to clockwise the relative phasing of these two outputs is now as illustrated in comparing FIGS. 6a and 6c with the output of switch 19 now leading by 90 electrical degrees rather than lagging by 90 electrical degrees. This relative phase difference can be determined by known digital processing techniques so that the direction of wheel rotation is available as a part of the information contained in the two square wave outputs.

The pair of phase displaced square wave output signals also provide enhanced sensitivity to the system since those two square waves may be combined, for example, in an A and B, or not A and not B logic circuit to provide the square wave of FIG. 6d having a repetition rate twice that of either of the switch output wave forms. Such a wave form is the same as one that would be obtained employing but a single sensor and twice the number of magnetic poles around the periphery of the wheel, thus lending an enhanced sensitivity of the encoder arrangement.

In general, if wheel 22 has n north and n south poles, each of the switches 19 and 21 will change its state or output $2n$ times during each revolution of the wheel and the desired 90 electrical degree lead or lag between the two output signals will be achieved whenever the angular separation between sensor 19 and sensor 21 relative to the axis of shaft 11 is $n90(2K+1)$ degrees where K is an integer.

Of course, as is common in the digital disciplines, the terms high, low, on, off and the like have only relative significance and depend upon the precise type of logic circuitry employed. As described, the Hall switches provide a high or on output when the field reaches the operating point, whereas that output drops to zero when the field diminishes to the release point, however, many commercially available switches have a mode of operation opposite in the sense that the switch goes from a high level to a low level or off when the field reaches the operating point and similarly returns to its high level at the release point.

Returning now to FIG. 1 the effective flux density at the sensitive region of the Hall devices 19 and 21 is, of course, dependent on the field strength of the individual poles about periphery 61 of wheel 22, the orientation of the respective bias or calibrating magnets 23 and 25 and is also dependent upon the air gap between periphery 61 and the sensor 19 or 21. Manufacturing tolerances among several assemblable parts frequently are cummulative and by known prior techniques do not adequately maintain uniformity of the air gaps, such as that between sensor 21 and peripheral surface 61. Forming the support frame 13 as a unitary mass, and in effect as a mechanical jig accurately controls the distance between the hole 15 and the pocket which receives one of the Hall effect switches and, since the diameter of the wheel 22 can rather accurately be controlled, this forming of the supporting frame in one piece serves as a means to accurately control the air gap with fewer dimensional tolerances than in prior art devices. Similarly, forming the support frame as one piece allows the angular separation between the pockets receiving switches 19 and 21 to be accurately controlled, so that they are separated by a fixed number of poles plus an additional half pole distance providing the desired uniformity in operation among several encoders manufactured according to the techniques of the present invention.

Explaining further, in considering that the device or unit of FIGS. 1 and 2 is to be mass produced, it is essential that from unit to unit, the performance characteristics be reasonably similar. The air gap between the periphery of the wheel 22 and the Hall effect sensors 19 and 21 is an important dimension to keep within close tolerance, since too much variation can result in erratic and unsatisfactory performance. The strengths of the poles on the wheel 22 can vary even though the cross over points or imaginary lines of demarcation between poles are accurately maintained. A calibrated Hall effect device has distinct operating and releasing points and it is true that the calibration cannot adjust for variation in peak amplitude of the magnet's field or variations in the air gap between the magnet and the Hall effect device. The variation in the air gap from unit to unit (FIG. 1, FIG. 2) will cause the accuracy of the pulse width to vary outside predetermined limits; hence, to provide by means of this invention a simple and inexpensive technique and structure for easily maintaining the size of an air gap between minimal limits, can and does constitute an important contribution to the art.

Maintaining this air gap substantially uniform from production unit to production unit, contributes to the performance of the units being essentially the same, that is, the switching performance being essentially the same. It is desired that this air gap be as small as possible.

As stated hereinabove, manufacturing tolerances among several assemblable parts are frequently cumulative and contribute to non-uniformity in the size of the air gaps between production units. A typical example of such prior art units, was to mount a disc-shaped magnet like wheel 22 onto a shaft which formed a part of an electric motor having the usual housing and end bells. The housing was provided with a mounting surface drilled and tapped for receiving threaded fasteners and a printed circuit board having a Hall effect sensor was mounted on the printed circuit board by means of its wire leads, such as leads 37 in FIG. 3. In this kind of a prior art structure the stack-up of tolerances can, by comparison, be tremendous due to the fact that bearings are pressed into the end bells, the shaft is pressed into such bearings, and then the magnet is mounted on the shaft and that has some tolerance. Furthermore, the threaded fasteners securing the printed circuit board provide dimensional variation as does the mounting of the Hall effect sensor on the circuit board by means of its terminal wire leads 37. The stack-up of tolerances can be so great that the resulting unit must be rejected because of not being within performance limits.

In the present invention, the shaft or post which mounts the disc-shaped magnet is considered to be the starting point or member for measuring to the position of the Hall effect sensor and then providing a means by which the sensor is precisely so positioned. Such means, of course, has to be inexpensive when mass produced. This means in this invention is the frame 13 which is injection molded of plastic, the pockets or cavities for the Hall sensors 19 and 21 being premolded as well as the hole 15 for the shaft 11. Thus, by forming the permanent wheel 22 as a molded part, its dimensional variations can be held within usual limits. Restarting, it is an objective to obtain accurate location of the sensors 19, 21 relative to the shaft 11 and more particularly the periphery of the wheel 22. In effect, the frame 13 may be compared with a common drill jig used for drilling holes at precise locations relative to a center such as the hole 15. In this invention the frame 13 may be considered to be that jig with the hole 15 already formed as well as the pockets for the two Hall effect sensors 19 and 21. While the shaft 15 is disclosed as being rotatable, a stationary post press fitted into the hole 15 may instead be used with other means being provided for rotatably mounting the wheel 22 on the post.

Further explaining, in designing the device, the physical and magnetic geometries between the magnetic wheel and the Hall sensors are finitely related. Physically, the center of opening 15 is located and a radius drawn. On this radius is molded the rectangular pocket for the sensor 19, the rear flat surface being normal to this radius and accurately located along the length thereof. The pocket is further so located that with the rectangular sensor 19 snugly received therein, the point 39 (FIG. 3) of maximum sensitivity is centered on this radius.

In magnetizing the wheel 22, the objective is to polarize the periphery normal thereto, or in other words, parallel to the radii. Thus, when an imaginary line of demarcation between adjacent poles on wheel 22 coincide with this radius, the flux field pattern will be symmetrically bisected. The flux concentration is thereby centered over the point 39 of maximum sensitivity, and assuring a uniform air gap of minimum width, the sensor will be uniformly actuated, pole to pole, as the wheel 22 rotates.

In order to locate the rectangular pocket for the second sensor 21, exactly the same types of measurements are made, but additionally sensors are located to lie on an arc that is concentric with the wheel 22 periphery and center of hole 15.

Thus forming frame 13 as explained requires a minimum of simplistic measurements and geometry in order to realize the advantages stated elsewhere.

Recapitulating, the frame 13 is pre-molded with the hole 15 and pockets for the two Hall effect sensors 19 and 21 formed in place. In assembly, the sensor frame is merely mounted on the shaft 11 and the Hall effect sensors 19 and 21 are installed into the respective pockets. The Hall effect sensors are thus automatically located relative to the hole 15 and shaft or post received therein.

Next, it becomes necessary to mount the wheel 22 on the shaft or post, and there will be some dimensional tolerances involved in this mounting which can affect the size of the air gap. However, these tolerances will always be present whether in the prior art arrangement described hereinbefore or in this invention. The stack-up of tolerances previously described, however, will not be present; therefore, the air gap between the Hall effect sensors 19 and 21 and the periphery of the wheel 22 can be made to be fairly uniform between production units, because all of the tolerances previously involved are not present here.

From the foregoing it is now apparent that a novel shaft rotation encoder as well as a novel method and apparatus for calibrating Hall effect devices and encoders employing such devices have been disclosed meeting the objects and advantageous features set out hereinbefore as well as others and that modifications as to the precise configuration, shapes and details may be made by those having ordinary skill in the art without departing from the spirit of the invention or the scope thereof as set out by the claims which follow.

What is claimed is:

1. The method of fabricating a magnetic-encoding device having a Hall effect switch and a rotatable disc-shaped actuating magnet comprising the steps of forming an integral frame with at least two component-locating positions, one of said component-locating positions being sized to receive snugly a Hall effect switch, fitting such a switch onto said one position thereby locating said switch-relative to the second of said two positions, forming a disc-shaped permanent magnet with circumferentially alternating poles on its periphery and a predetermined outer diameter, mounting said magnet for rotation about its axis to said second position with its periphery adjacent to said Hall effect switch, said second portion serving to locate said magnet relative to said switch whereby said frame and said two component-locating positions serve to locate and position said switch and magnet relative to each other with a minimum of dimensional tolerance therebetween.

2. The method of claim 1 including the step of mounting a magnet-mounting post on said second position, said second position and said post having been preformed to fit together with predetermined dimensional tolerance, and mounting said magnet on said post.

3. The method of claim 1 wherein said first position is a cavity shaped to receive and to locate said switch said second position being a hole sized to receive a post or shaft on which said magnet is mounted.

* * * * *